(12) United States Patent
Mercat et al.

(10) Patent No.: US 7,156,764 B2
(45) Date of Patent: Jan. 2, 2007

(54) EXTENSIBLE CHAINWHEEL FOR A BICYCLE POWERTRAIN ASSEMBLY

(75) Inventors: Jean-Pierre Mercat, Chavanod (FR); Bertrand Cauvin, Trevonx (FR)

(73) Assignee: Salomon S.A., Metz-Tessy (FR)

( * ) Notice: Subject to any disclaimer, the term of this patent is extended or adjusted under 35 U.S.C. 154(b) by 306 days.

(21) Appl. No.: 10/432,621

(22) PCT Filed: Dec. 21, 2001

(86) PCT No.: PCT/FR01/04155

§ 371 (c)(1), (2), (4) Date: Jun. 5, 2003

(87) PCT Pub. No.: WO02/053451

PCT Pub. Date: Jul. 11, 2002

(65) Prior Publication Data

US 2004/0029667 A1 Feb. 12, 2004

(30) Foreign Application Priority Data

Dec. 29, 2000 (FR) .................................. 00 17354

(51) Int. Cl.
*F16H 55/30* (2006.01)
(52) U.S. Cl. ........................................ 474/47; 474/152
(58) Field of Classification Search ................ 747/47, 747/50, 56, 95, 152
See application file for complete search history.

(56) References Cited

U.S. PATENT DOCUMENTS

| | | | | |
|---|---|---|---|---|
| 4,493,678 A | * | 1/1985 | Husted | ........................ 474/164 |
| 4,961,719 A | * | 10/1990 | Wildermuth | .................. 474/50 |
| 5,358,451 A | | 10/1994 | Lacombe et al. | |
| 5,476,422 A | * | 12/1995 | Schendel | ....................... 474/49 |
| 5,577,969 A | | 11/1996 | Watarai | ........................ 474/78 |
| 5,582,555 A | * | 12/1996 | Miller | ........................... 474/49 |
| 5,653,649 A | | 8/1997 | Watarai | ........................ 474/78 |
| 5,772,546 A | | 6/1998 | Warszewski | .................. 474/70 |

FOREIGN PATENT DOCUMENTS

| | | |
|---|---|---|
| EP | 0 558 425 A1 | 9/1993 |
| EP | 0647558 | 4/1995 |
| FR | 961 243 | 5/1950 |
| FR | 1 140 134 | 7/1957 |
| FR | 1 542 594 | 10/1968 |
| FR | 2460248 | 1/1981 |
| JP | 52-115033 | 9/1977 |
| WO | WO 83/02925 | 9/1983 |

* cited by examiner

*Primary Examiner*—Vicky A. Johnson
(74) *Attorney, Agent, or Firm*—Greenblum & Bernstein, P.L.C.

(57) ABSTRACT

A driving sprocket, or chainwheel, for a bicycle crankset having a toothed ring whose ring is divided into a plurality of segments, the segments being borne by a frame that is rotationally movable about a crankset axle, each sprocket segment being movable between a low position and a high position, a system for transferring each segment to transfer said segment from one position to another, and an indexing mechanism to control the system for shifting the segments. Each segment of the driving sprocket is floating mounted with respect to the frame and is guided in its transfer movement along a trajectory having a radial component and a tangent component.

25 Claims, 12 Drawing Sheets

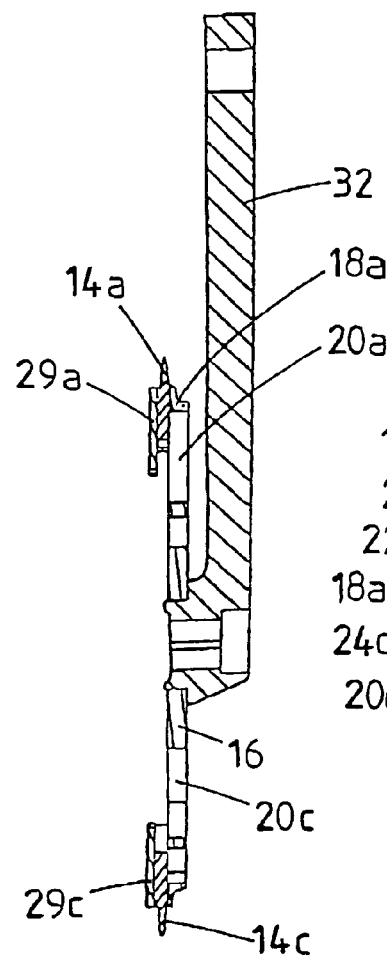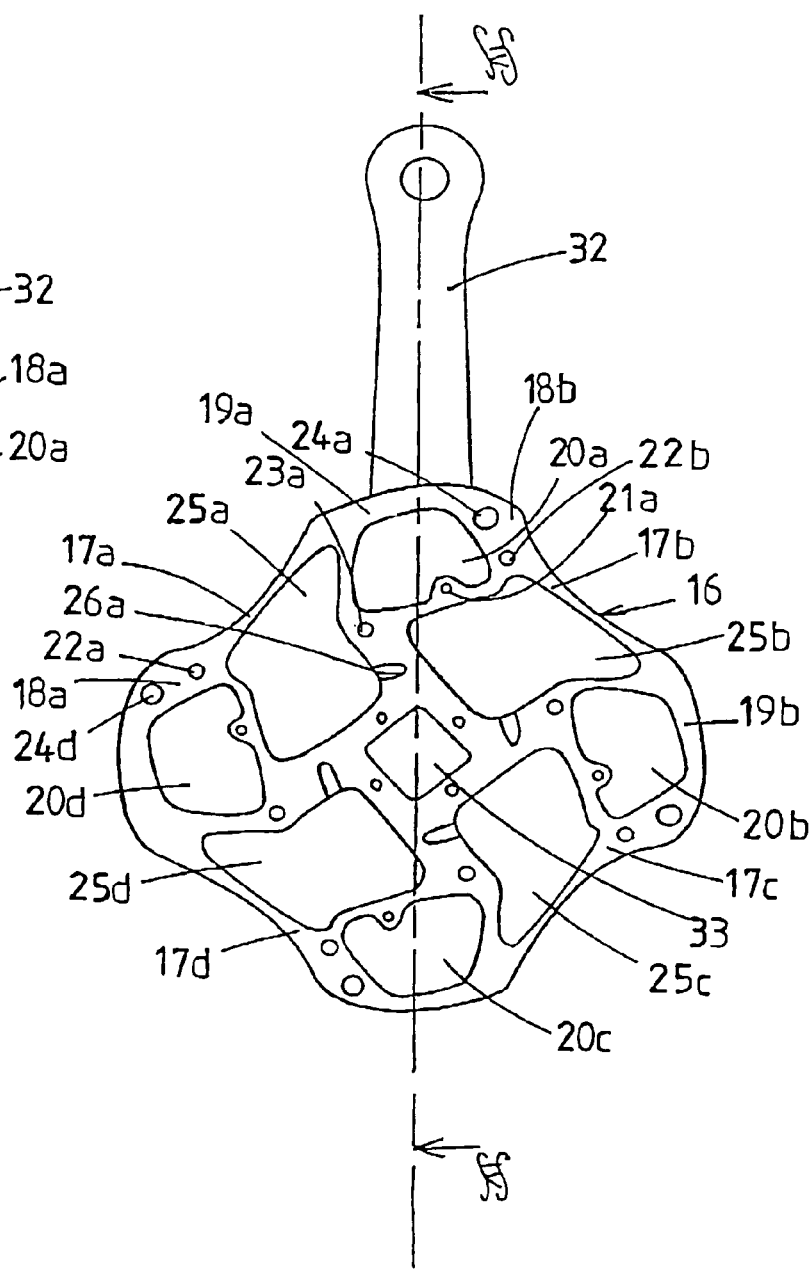

EXTENSIBLE CHAINWHEEL FOR A BICYCLE POWERTRAIN ASSEMBLY

BACKGROUND OF THE INVENTION

1. Field of the Invention

The invention relates to an extensible driving sprocket for a bicycle transmission assembly.

2. Description of Background and Relevant Information

Extensible driving sprockets, or chainwheels, in bicycle transmission assemblies are known to perform a progressive gear shift.

For example, French Patent Publication FR 961 243 describes a drive sprocket having four pinions for driving the chain that are radially extensible.

For this type of construction, the chain follows a polygonal trajectory in the area of the drive sprocket, with substantial variations in distance from the axle of the sprocket which result in a corresponding substantial variation in the pedaling force.

French Patent Publications FR 1 140 134 and FR 1 542 594 describe another constructional embodiment, according to which the sprocket does not have pinions but instead radially extensible ring segments.

The drawback to these types of construction is controlling the transitory phases. It is readily understood that at the non-extensible state the segments are contiguous and that in their various states of extension, they leave between them a space that is equal to a whole number of the pitch of the chain. However, in the case of a radial extension, there is the drawback of controlling the space between two contiguous segments during the transitory phases, i.e., during the passage of the segments to the following phase of extension or retraction.

Another flaw in these known constructions is that they seek to multiply the number of transmission ratios, i.e., the number of positions for extending the segments. However, the further apart the sprocket segments are, the more difficult it is to change the segment positions, and the more perceptible is the previously mentioned phenomenon of polygonal trajectory.

Another flaw is that the mechanism for radially extending the segments is located toward the middle of the segment. It directly sustains the forces resulting from the tension of the chain. Furthermore, it is overhangingly stressed each time a segment is partially engaged with the chain. Added to this is the fact that the sprocket applies pressure to the taut strand of the chain, i.e., the strand that has the maximum stress.

SUMMARY OF THE INVENTION

An object of the invention is to propose an extensible drive sprocket, or chainwheel, that improves the gear shift.

Another object of the invention is to propose an extensible sprocket in which the segments work under better conditions.

To this end, the invention proposes a driving sprocket for a bicycle crankset having a toothed ring in which one pitch of the teeth are in correspondence with one pitch of the chain, the ring being divided into a plurality of segments, the segments being borne by a frame that is rotationally movable about a crankset axle, each sprocket segment being movable with respect to the frame in a plane perpendicular to the crankset axle between a low position and a high position, in which it is spaced further from the crankset axle, thus defining a small diameter state and an imaginary large diameter state of the sprocket, a system for transferring each segment to transfer said segment from one position to another, and an indexing mechanism to control the system for shifting the segments. Each segment of the sprocket is floatingly mounted with respect to the frame and is guided in its transfer movement along a trajectory including a radial component and a tangent component.

The transfer system and the indexing mechanism ensure a change of state of the sprocket between a small diameter state in which all of the segments are in the low position and a large diameter state in which all of the segments are in the high position. The passage from one state to the other occurs by successively transferring the segments from one position to the other at the moment of rotation of the sprocket when the segment is not engaged with the chain, i.e., during its raising phase.

The invention is based on the following observation. By displacing the segments one by one along a trajectory that is both radial and tangential when they are being raised or lowered, it is possible to remain substantially synchronized with the chain pitch for each change of state of the sprocket. The transfer of the chain from one state to the other of the sprocket occurs by maintaining the teeth of the segments in correspondence with the chain pitch, with an acceptable clearance, particularly when a segment having a low or high position different from the segment preceding it comes under the taut strand of the chain. The change of state of the sprocket therefore occurs smoothly, with no hooking or forcing of the chain.

BRIEF DESCRIPTION OF THE DRAWINGS

The invention will be better understood with reference to the following description and the attached drawings related thereto, and in which:

FIG. 3 shows the frame of a first constructional embodiment of the sprocket;

FIG. 4 is a cross-sectional view of the frame;

FIGS. 11–14 show the guiding device in its various positions;

DETAILED DESCRIPTION OF THE INVENTION

Figure 1:
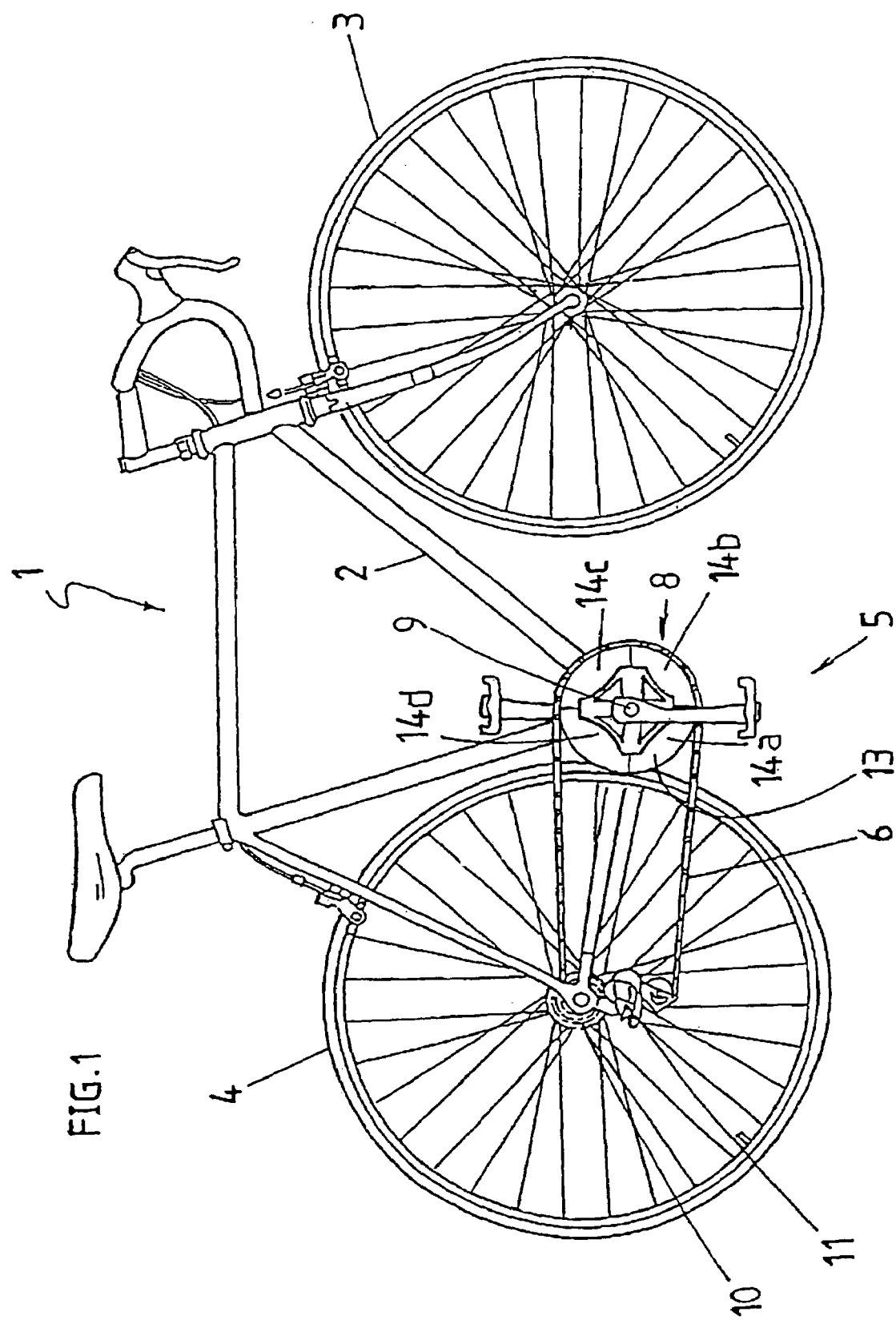
FIG. 1 is an overall view of a bicycle and schematically shows a driving sprocket according to the invention in the retracted state.

FIG. 1 shows a bicycle 1 that has, as is conventional, a frame 2, front and rear wheels 3 and 4, as well as a transmission system 5. The transmission system is composed of a driving chain 6 that is driven in rotation by a crankset 8 that is movable about a crankset axle 9 borne by the frame. The chain in turn drives the rear wheel by means of a cassette of sprockets 10 having varying numbers of teeth. A rear derailleur schematically shown as 11 guides the transfer of the chain from one sprocket to another.

The crankset 8 has, as known, a sprocket, i.e., a driving sprocket or chainwheel 13, the periphery of which has teeth in correspondence with the pitch of the chain 6. The terms driving sprocket, drive sprocket, and chainwheel are used interchangeably herein for the particular embodiment being described.

In order to change the expansion ratio, the chainwheel 13 is constructed with movable segments, the position of which is modified with respect to the crankset axle. The segments can occupy two stable positions that correspond to various diameter states of the chainwheel.

In the embodiment shown in the drawings, the chainwheel 13 has a toothed ring that is formed of four segments 14a, 14b, 14c, 14d, each covering a ninety degree angle.

FIG. 1 shows the four segments of the ring in their low position. In this position, the segments are adjacent and form a continuous toothed ring. This corresponds to the small diameter state of the ring.

Figure 2:
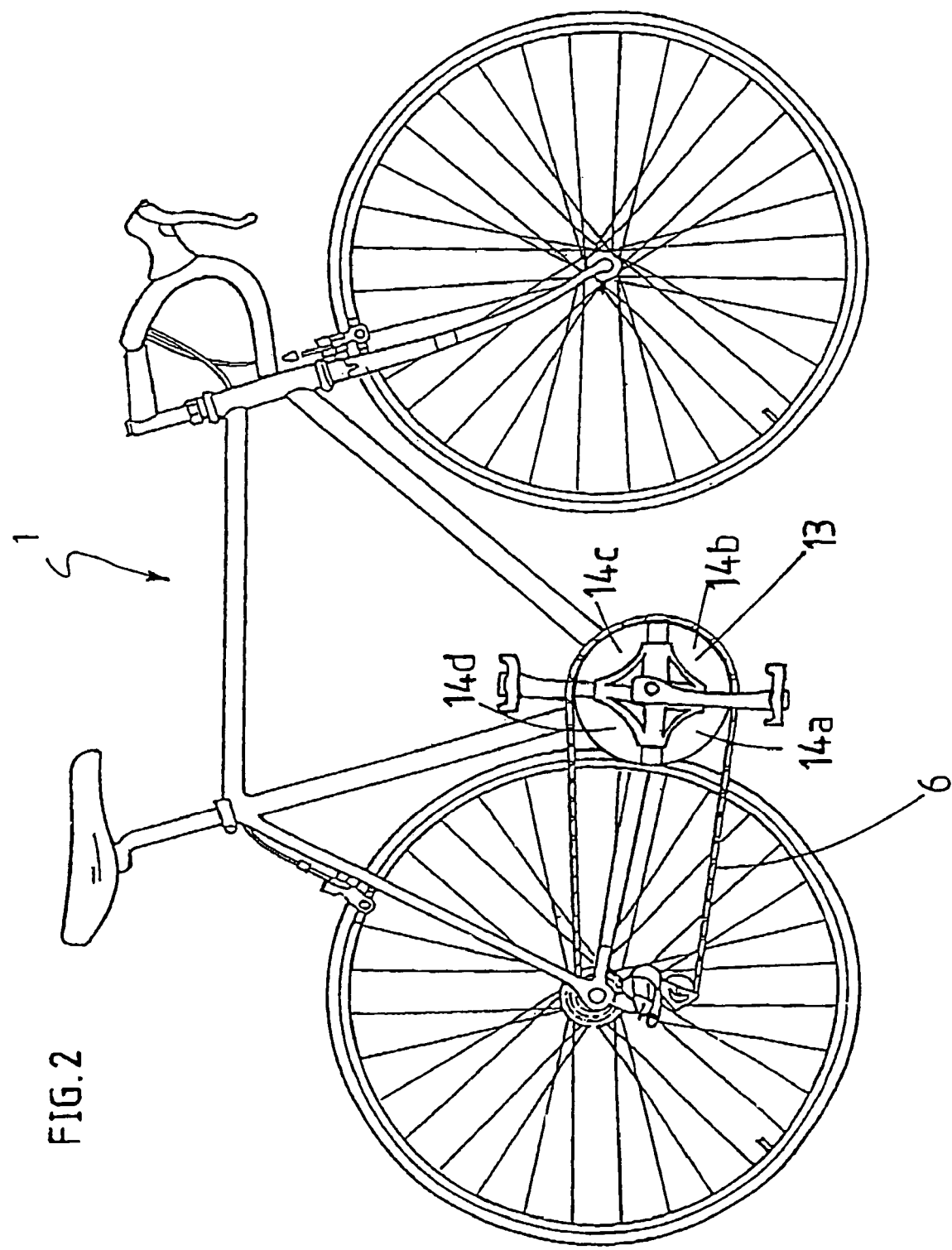
FIG. 2 shows the bicycle with its driving sprocket in the extended state.

In FIG. 2, the four segments 14a, 14b, 14c, 14d are in their high position that corresponds to the large diameter state of the ring.

As known, in the position of large diameter, the segments are separated by a distance corresponding to a whole number of pitch in order to keep the chain continuously meshed on the teeth of the chainwheel.

For example, if one considers a chainwheel having 44 teeth in its small diameter state, formed of four segments of 11 teeth each, it is possible through the extension of the segments to create a distance of one chain pitch between two consecutive chainwheels. This results in an imaginary chainwheel of 48 teeth, i.e., a chainwheel having an expansion of 48 teeth. If the segments are displaced along a strictly radial trajectory, there is discontinuity in the pitch of the chainwheel teeth during the transition between two segments having different positions. This distance corresponds approximately to one chain half-pitch. In these conditions, the chain rises temporarily on the teeth until the end of this transitory period in which it regains a correct meshing position.

The invention, on the contrary, provides displacing the segments one by one along a trajectory that has a radial component and a tangential component.

Thus, with reference to the previous example, during the change of state of the chainwheel from a state of 44 teeth to an imaginary state of 48 teeth, the segments are displaced one by one along a radial component that aligns them along the radius of the imaginary chainwheel of 48 teeth, and a tangent component. The tangent component is determined such that at the junction of the two adjacent segments, one in the position of 44 teeth, the other in the position of 48 teeth, the teeth of the two segments are in correspondence with the teeth of the chain. In practice, good results were obtained by displacing the segment along a tangent or almost tangent trajectory that displaces the segment in question in the rotational direction of the chainwheel by an additional fraction that compensates for the spacing of the teeth at the junction of the two chainwheel segments induced by the difference in radius. In other words, care is taken not to introduce any pitch or fraction of an intermediary chain pitch between the two segments.

Following the rotation of the chainwheel, the other segments change position along the same radial and tangent trajectories that space them one from the other by a space corresponding to one chain pitch. In the large diameter state of the chainwheel, the segments of 11 teeth have between them a space of one chain pitch, giving a total of 48 imaginary teeth.

By proceeding in this manner, it was noted that inversely, during the passage of the chainwheel from its imaginary large diameter state to its small diameter state, the trajectory of the segment described in the opposite direction maintained a space corresponding to one chain pitch between two consecutive segments, one in the position of 48 teeth and the other in the position of 44 teeth, with an acceptable clearance. Since the other segments successively follow the same trajectory, the spaces between two consecutive segments disappear until the chainwheel completely returns to its state of 44 teeth.

Thus, under these conditions, the correspondence between the chainwheel teeth and the chain pitch is constantly maintained, particularly during all of the transitory phases of the segment extension or retraction, with an acceptable clearance. The change of state of the chainwheel occurs therefore under very good conditions, even though it occurs on the taut strand of the chain. As a matter of fact, there is no chainwheel change per se. Furthermore, the chain encounters no noted discontinuity in the teeth, particularly during a change of state of the chainwheel.

In the high position of the chainwheel, the segment teeth do not follow a circular curvature precisely. Nevertheless, for the example mentioned hereinabove, the variation in radius is on the order of 2%, which is practically imperceptible in terms of the pedaling speed.

Advantageously, the change of position of a segment is caused in the raising phase of the segment in question under the taut strand of the chain. Under these conditions, the segment can be led along several possible trajectories, as long as it has reached its final high or low position when it comes under the taut strand of the chain.

Advantageously, the change of state of the chainwheel induces a relatively small variation in the linear speed of the chain, and therefore of the expansion. Generally, this variation is on the order of 9% in the present example. Preferably, the driving sprocket, or chainwheel, according to the invention is associated with a cassette of sprockets or gears whose variation in the number of teeth between two successive gears is on the order of 18% for the variation ratio in the area of the driving sprocket to remain less than the variation ratio in the area of two successive gears.

As an example, good results were obtained for a road bicycle having such a driving sprocket associated with a cassette of eight gears having 11, 13, 15, 18, 21, 25, 30 and 36 teeth, respectively. Advantageously, the rear derailleur is built according to the European Patent Publication EP 558 425, and the gear shifts at the front and rear are guided by an electronic control system ensuring a synchronized control of the gear shifts in the area of the driving sprocket and of the rear derailleur.

This system is provided to function in the following manner. Starting, for example, with the highest transmission ratio, the first gear shift is a change of state of the driving sprocket from its large diameter state to its small diameter state, the second is a simultaneous change of gears and of a change of state of the driving sprocket to return it to its initial state, then again a change of state of the driving sprocket alone, and so on.

The following table shows the transmission ratios and the variations of ratios system adapted to a road bicycle.

| State of the driving sprocket | Number of gear teeth | Transmission ratio | Variation of the ratio % |
|---|---|---|---|
| 48 | 11 | 4.36 | |
| 44 | 11 | 4.00 | 9.09 |
| 48 | 13 | 3.69 | 8.33 |
| 44 | 13 | 3.38 | 9.09 |
| 48 | 15 | 3.20 | 5.77 |
| 44 | 15 | 2.93 | 9.09 |
| 48 | 18 | 2.67 | 10.00 |
| 44 | 18 | 2.44 | 9.09 |
| 48 | 21 | 2.29 | 6.94 |
| 44 | 21 | 2.10 | 9.09 |
| 48 | 25 | 1.92 | 9.13 |
| 44 | 25 | 1.76 | 9.09 |
| 48 | 30 | 1.60 | 10.00 |
| 44 | 30 | 1.47 | 9.09 |
| 48 | 36 | 1.33 | 10.00 |
| 44 | 36 | 1.22 | 9.09 |

The range of transmission ratios varies from 4.36 up to 1.22, with an overall ratio of 3.57.

If this table is compared to a conventional system, one can note that there is no longer any overlap in the succession of the various ratios. Furthermore, the variation of the ratios is much more even and centered on a value of 8%, which improves of the comfort and the flexibility in using the system. Additionally, the range of ratios is wider.

Furthermore, one can note that a range of transmission ratios equivalent to the range of a conventional system could be covered with only six gears by eliminating the larger diameter gears.

By reducing the number of gears with respect to a conventional system, one decreases the drawbacks related to an incorrect alignment of the chain. Indeed, this alignment flaw occurs over a more reduced angular amplitude.

One also reduces the bulkiness of the gear cassette on the hub body, which allows spacing apart the flanges for fastening the spokes on the hub, thereby resulting in a better balancing of the spoke tensions and a greater rigidity of the wheel. There is also a reduction in weight in the area of the gears.

Compared to a conventional system, it is certain that there are here more ratio changes in the area of the secondary sub-assembly.

However, these changes of ratios occur alone or in combination with a single gear change. Furthermore, they induce a more reduced ratio variation than in the conventional case. Finally, they are caused by an expansion of the driving sprocket, or chainwheel, and not by a derailleur acting on the taut strand of the chain. The output is therefore much better and the transition times are shorter.

This embodiment is not limiting. Specifically, other values for the number of teeth could be used.

According to the constructional embodiment of the driving sprocket, or chainwheel, that will now be described, the displacement of a segment from one position to the other occurs with a double shifting movement. This movement allows controlling the trajectory of the segment along the two radial and tangent components. The embodiment that will be described relates, in a non-limiting manner, to a driving sprocket/chainwheel of 44 teeth formed of 4 segments having 11 extensible teeth for an imaginary state of 48 teeth.

In order to simplify the description, the elements will be designated by one reference numeral and, if necessary, by a reference character a, b, c or d related to a segment. From one segment to the other, the same elements will be designated by the same reference numeral but a different reference character.

The chainwheel has a central support frame 16 that bears the four segments. The frame is shown in FIG. 3. Depending on the figure, the frame 16 is a flattened structure having an approximately square form. Along the sides of this square form, the frame has zones 17a, 17b, 17c, 17d that are provided to allow the guiding of the ends of two adjacent segments of the chainwheel.

Given the normal rotational direction of the frame, the zone 17a has, forwardly and rearwardly, guiding surfaces 18a and 19a for each of the forward and rearward zones of a segment. The rearward surface 19a extends to the edge of a cavity 20a provided for a return spring that is described below. At the edge of the cavity, a bore 21a is provided for the fastening of the previously mentioned spring. Three other bores, 22a, 23a, 24a, respectively, are adapted to be used as a housing for a guiding pin, the journal axle of a shifting lever and a guiding abutment, respectively. These various elements are described hereinafter.

The other zones are similar to what has just been described.

Between the cavities 20a, 20b, 20c, 20d, the frame 16 has lightening openings 25a, 25b, 25c, 25d. These openings are optional, their form is not limiting.

Toward the crankset axle, a groove 26a is machined approximately halfway between the bore 23a provided for the shifting lever and the crankset axle. This groove is centered on the bore 23a. Its function is to limit the angular movement of the lever which is described below.

Plates, such as the plate 29a, are provided to be assembled opposite the guiding surfaces of two adjacent segments, particularly 19a and 18b, so as to leave a guiding space for the forward and rearward zones of two adjacent segments. These plates have bores 30a, 31a that correspond to the bores 24a and 22b. The plates are assembled to the frame 16 by any appropriate means, for example, screws and spacers. On the back, the plates have a guiding abutment 45a for the rearward zone of the segment traversed by the bore 30a.

To assist in understanding the drawings, the plates are not shown in the following figures, only the guiding abutment is seen.

A crank arm 32 is affixedly connected to the frame 16 which, in the center, has a square bore 33 for the crankset axle and the other crank arm. Another constructional embodiment of the cranks can also be used.

Figure 7:
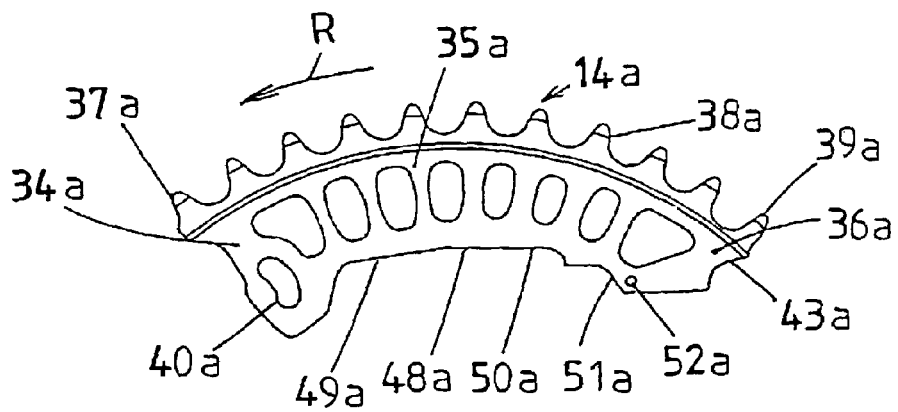
FIG. 7 shows a sprocket segment.

The segment 14a will now be described with reference to FIG. 7, the other segments are identical. The segment 14a generally has the form of a crescent with a forward zone 34a, a median zone 35a and a rearward zone 36a, given its normal rotational direction marked by the arrow R.

At its periphery, the segment 14a has a toothing 38a with 11 teeth made in correspondence with the chain pitch. In the present case of four segments, the teeth cover a quarter of the teeth of the chainwheel. The teeth extend along a circular curvature centered on the crankset axle when the segment is in a low position, i.e., the position of FIG. 1. As an alternative, the curvature could be centered on the crankset axle when the segment is in a high position or yet in an intermediate position.

Preferably, the last tooth 39a of the segment is machined along its descending surface and the depth of the space between the teeth which follows it is increased. The object of this arrangement is to allow the chain to dip along a direction tangent to the segment that is rearward of the segment. This facilitates the transfer of the chain during a retraction of the segments.

In the forward zone, the segment 14a has a guiding slot 40a in the shape of a bean. The slot is oriented approximately along a radial direction, with the central portion of the bean oriented toward the rearward zone.

A guiding pin 41a, housed in the bore 22a of the frame, extends through the slot 40a, as shown in FIGS. 15–18. The pin 41a circulates in the slot 40a without a transverse clearance, except for the operational clearance, and, with its ends, the slot limits the displacement of the forward zone 34a of the segment during its change of position. The radial length of the slot is approximately equal to the amplitude of radial displacement of the segment, with the exception of the pin diameter. In the low position of the segment, the pin guides the slot so that the first tooth 37a of the segment is spaced by one chain pitch from the last tooth of the preceding segment that is also in the low position. In this manner, the chainwheel has 44 teeth. In the high position, the pin guides the slot so that the first tooth 37a is spaced from the axis of the hub by a distance corresponding substantially to the radius of a chainwheel of 48 teeth, and so that it is spaced from the tooth that precedes it by a distance equal to one chain pitch, the preceding segment being in the low position.

Figure 5:
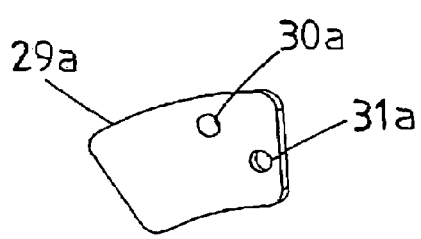
FIG. 5 is a perspective view of a plate seen from the outside.
Figure 6:
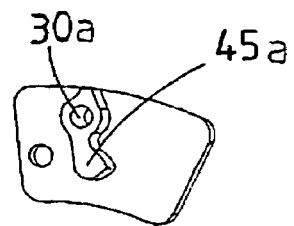
FIG. 6 shows in perspective the plate seen from the inside.

A recess 43a is located at the end of its rearward zone 36a of the segment. The edge of the recess takes support on the guiding abutment 45a that is located on the back of the plate, such as plate 29a, e.g. (see FIG. 5), when the rearward zone 36a is in the low position.

At the base of the segment, i.e., towards the crankset axle, the segment is demarcated by a ramp 48a provided to cooperate with a shifting lever that is described below. The ramp 48a has a general direction that is perpendicular to a radial direction. It has two slopes 49a, 50a that are each located toward a forward and rearward zone of the segment and form therebetween a dihedral angle whose apex is slightly inferior to a flat angle.

At its rearward end, the slope 50a is stopped by a return 51a adapted to be used as an abutment for the shifting lever. When the segment is positioned on the frame 16, the return 51a and the bore 23a for the pivoting axis of the lever are approximately aligned in the same radial direction.

In this rearward zone of the segment, a bore 52a is provided for a return spring that is described below. The bore 52a is located on the segment in its low position, between the slot 40a and the recess 43a, so that a traction exerted by the spring can have a return action in the direction of the crankset axle on both of the forward and rearward zones.

Figure 8:
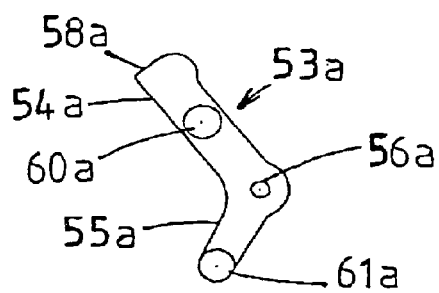
FIG. 8 is a side view of a control lever.
Figure 9:
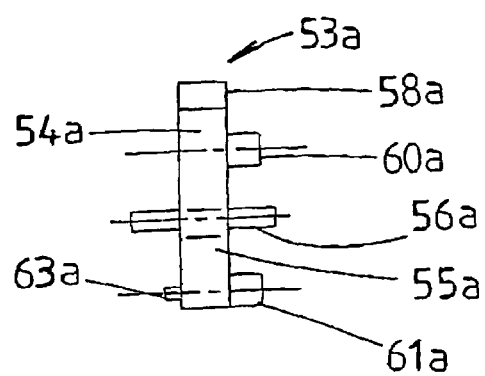
FIG. 9 shows the lever seen from the front.
Figure 10:
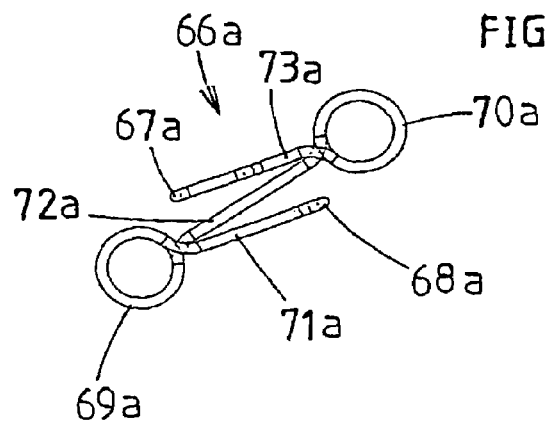
FIG. 10 shows the return spring of a segment.
Figure 11:
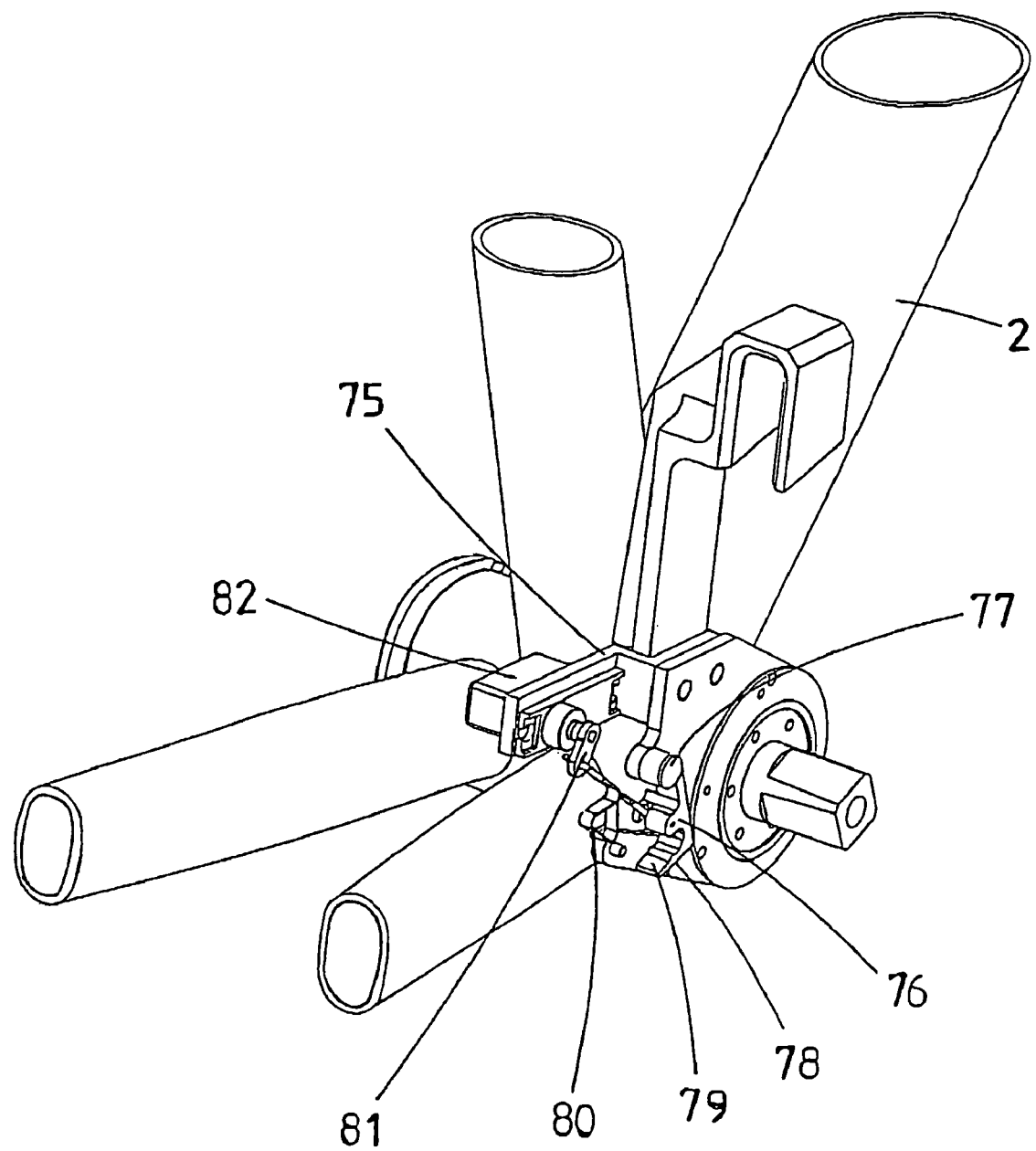
FIG. 11 shows in perspective the device for guiding the levers mounted on the frame.

A shifting lever 53a for changing the position of the segment 14a is shown in FIGS. 8 and 9. The lever has two arms 54a and 55a extending on both sides of a pivoting axle 56a and forming therebetween an angle slightly greater than a right angle. The pivoting axle 56a is housed in the bore 23a of the frame 16. The longest arm 54a has a head 58a provided to cooperate with the ramp 48a of the segment. The length of the arm 54a is determined as a function of the ramp 48a to bring the teeth of the rearward zone 36a of the segment approximately along the radius of a sprocket of 48 teeth.

At an equal distance from the pivoting axle 56a, each of the arms 54a and 55a bears a stop 60a, 61a for indexing the lever. The stop 60a, located on the same side of the axle 56a as the head 58a, is called an extension stop. The other stop 61a that is closer to the crankset axle is called a retraction stop.

A rod 63a, located on the shortest arm, opposite the stop 61a, moves in the groove 26a of the frame. In one of the stable positions of the lever, the rod is at the bottom of the groove 26a.

Each of the segments is elastically returned to the low position and maintained in this position by a return spring that connects it to the frame 16. For the segment 14a, a spring 66a is provided with its two ends 67a and 68a housed in the bores 52a of the rearward zone of the segment and 21a of the frame, respectively. As for the body of the spring, it is housed in the cavity 20a of the frame. According to the preferred constructional embodiment of the spring shown in the figures, the body of the spring has two coils 69a, 70a, connected together and at the ends by arms 71a, 72a, 73a. Under these conditions, the spring 66a is non-linear and has a small space requirement. Its return force increases rapidly over an amplitude of extension that corresponds to its initial pre-stressing. Also, its return force is relatively stable.

An indexing mechanism is provided to control the shifting of the levers and therefore the transfer of the segments from one position to another. This mechanism is affixedly mounted, for example, to the frame 2 of the bicycle. It has a plate 75 that is mounted, for example, to the bearing surface of the crankset axle, and which is tightened with the tightening nut of the axle. The plate carries a movable indexing connecting rod 76 that is articulated about an axle 77 borne by the plate. Seen from the side, the axle 77 is in the vicinity of the trajectory of the pivoting axles of the levers and, in particular, of the axle 56a of the lever 53a. The connecting rod has a base 78 opposite the axle 77. The base 78 has an end support surface that is substantially perpendicular to the longitudinal direction defined by the connecting rod and, preferably, it has a flexible zone 79 that is oriented toward the exterior of the chainwheel. According to the embodiment shown, the connecting rod is driven by a rod 80 that is itself attached to the output cam 81 of a servomotor 82 that is electrically actuated. Other means could also be used, such as a rotatable or linear electromagnet, or a piezoelectric actuator.

The servomotor is guided by an electronic control system that is described below. Depending on the angular position of the connecting rod 76, the base 78 is provided to oppose the indexing stops of the lever or, on the contrary, to avoid the stops in question during the rotation of the driving sprocket/chainwheel.

Figure 12:
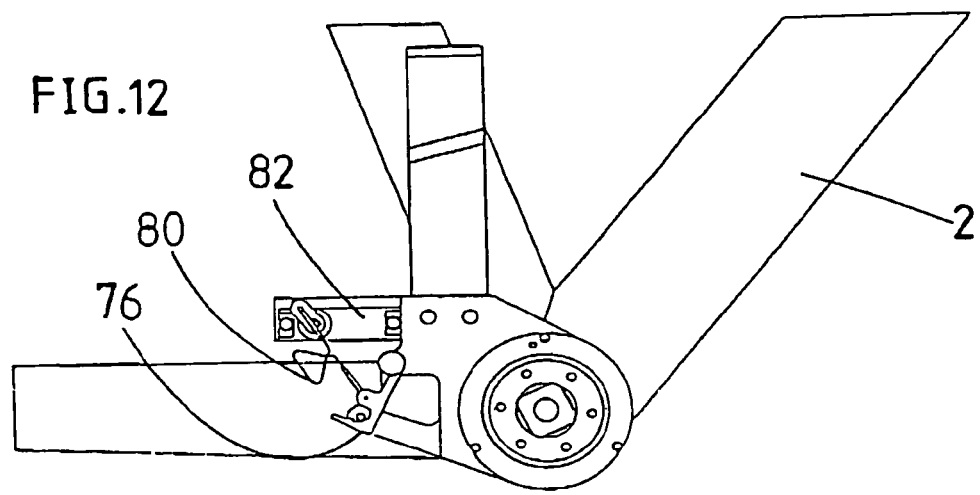
Figure 13:
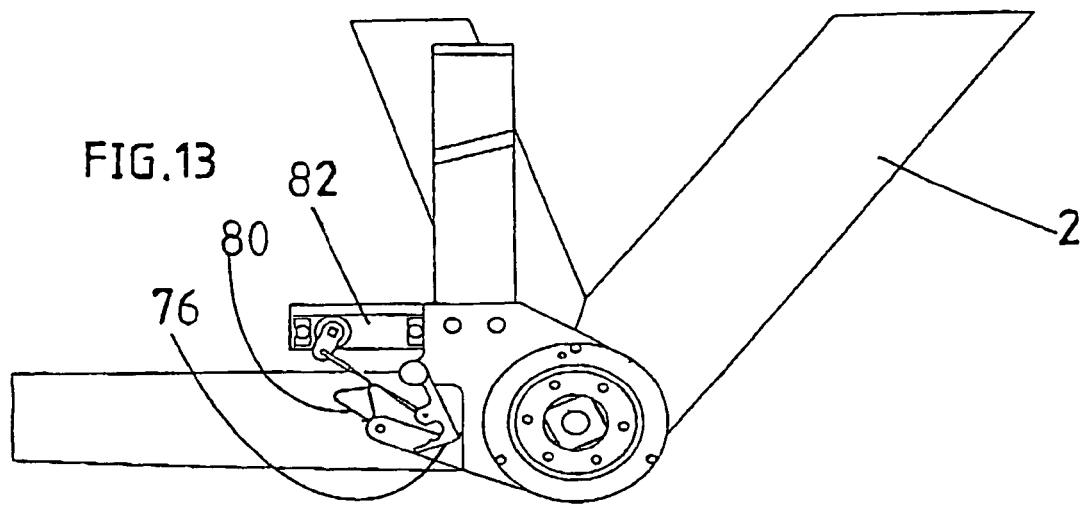

FIGS. 12 and 13 show the connecting rod in the position where it opposes the extension and retraction stops, respectively, i.e., the stops 61a and 60a for the lever 53a.

Figure 14:
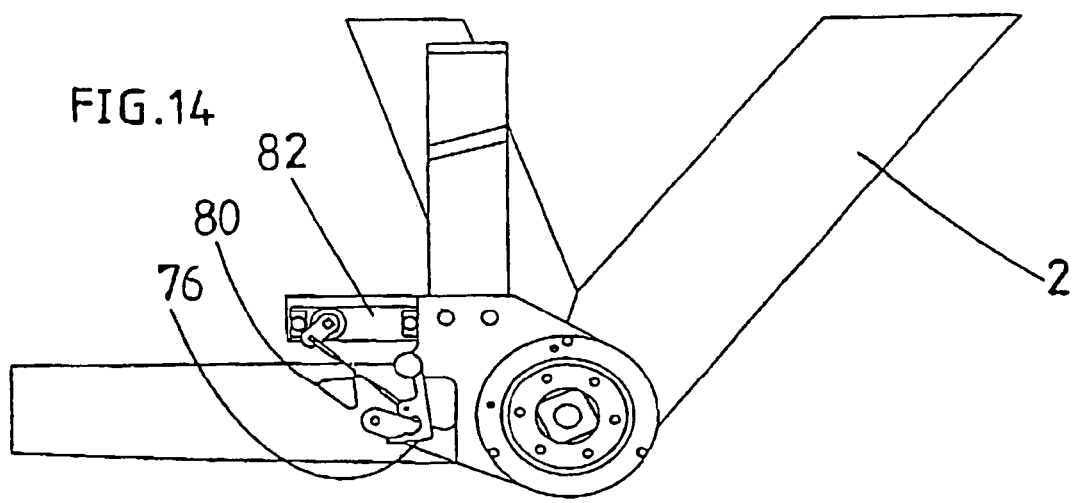

FIG. 14 shows the connecting rod in an intermediate position where it is out of the reach of the various stops.

The transfer of the segment 14a from one position to the other is shown in FIGS. 15–18.

Figure 15:
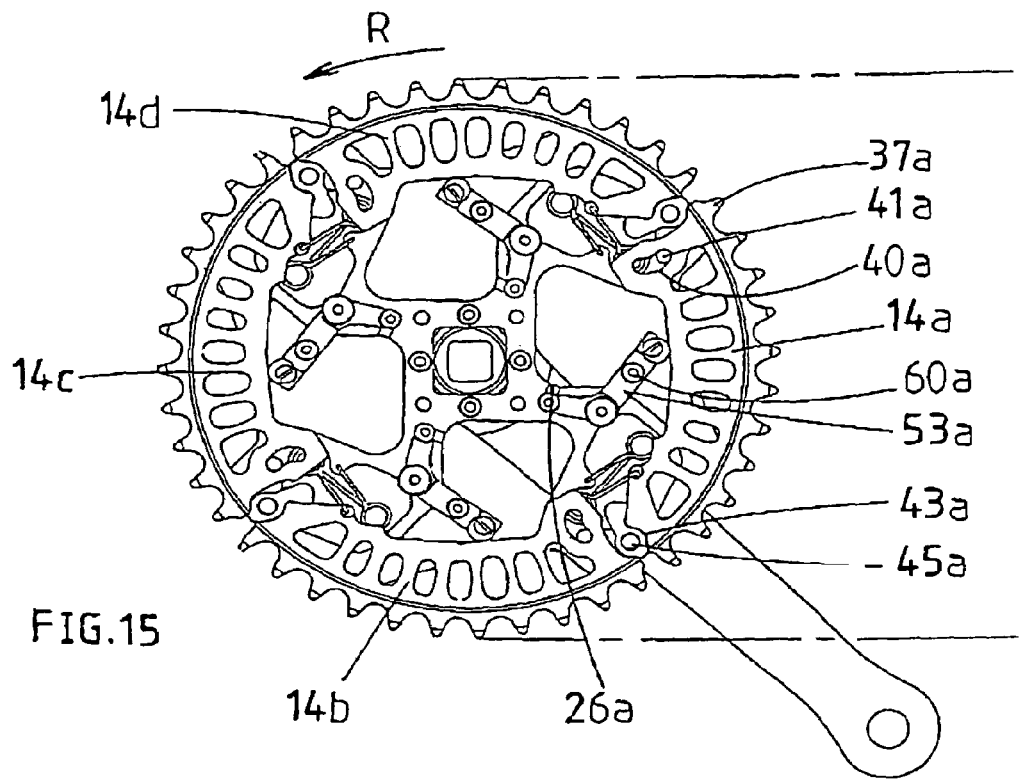
FIG. 15 shows the sprocket with all of the segments in the low position.

As shown in FIG. 15, the segment 14a and the other segments are initially in the low position and are maintained in this position by their respective return springs. In this position, the teeth of the segments are contiguous. The chainwheel generally functions like a small diameter chainwheel.

The levers, particularly the lever 53a, are in the stable position shown in FIG. 15. Under the effect of the spring 66a that returns the segment 14a to the low position, the head 58a of the arm 54a is returned toward the crankset axle, and the end 61a of the other arm 55a is maintained in abutment at the bottom of the groove 26a.

The control connecting rod is positioned in an intermediate position, as shown in FIG. 14, which positions its base 78 out of the reach of the stops 60*a* and 61*a* for pivoting the lever.

In order to control a change in the position of the segment 14*a*, the servomotor guides the connecting rod so as to bring the base 78 along the trajectory of the extension stop 60*a* so as to cause the pivoting of the lever 53*a* with the rotation of the chainwheel. This position of the control connecting rod is shown in FIG. 13.

Figure 16:
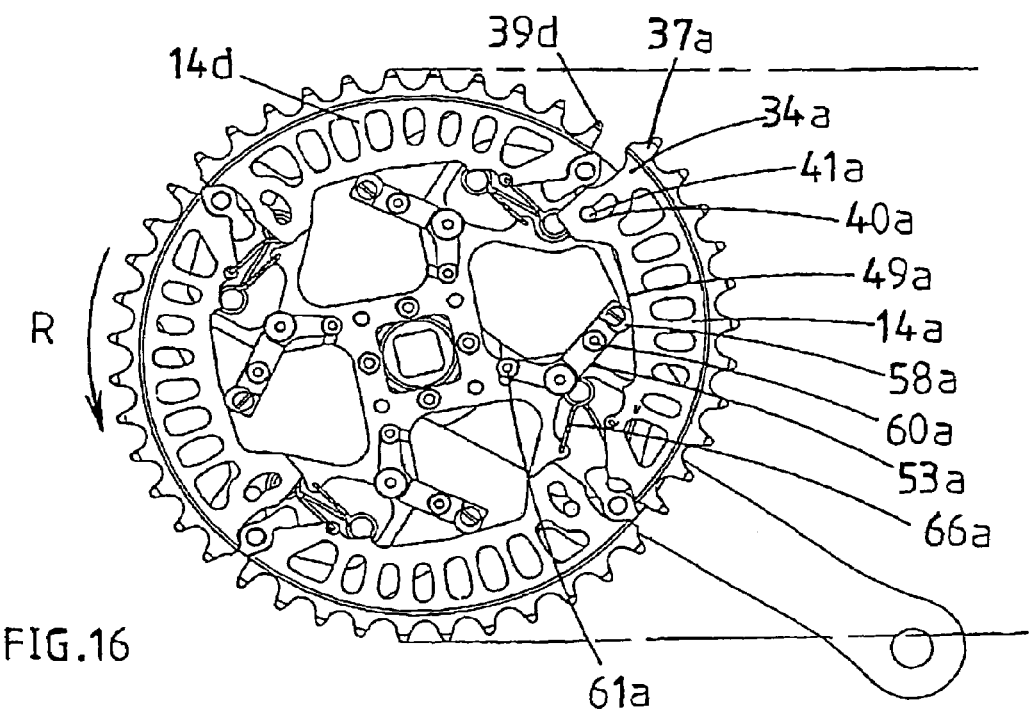
FIGS. 16 and 17 show the two raising phases of a segment.

In a first pivoting phase of the lever shown in FIG. 16, the head 58*a* of the lever follows the slope 49*a* of the ramp 48*a*. The lever then operates a first shifting of the segment 14*a*. The forward zone moves away from the crankset axle until the pin 41*a* reaches the end of the slot 40*a*. The pin reaches the end of the slot 40*a* at the same time as the head of the lever reaches the connection of the two slopes 49*a* and 50*a*. The position of the slope 49*a* near the forward zone 34*a* of the segment and its sloping with respect to the lead angle of the head 58*a* allow this first shifting movement of the forward zone 34*a*.

In a second phase, the connecting rod continues to oppose the passage of the stop 60*a*. The lever 53*a* continues to pivot with the rotation of the chainwheel. Its head 58*a* attacks the second slope 50*a* of the ramp 48*a* and forces the rearward zone of the segment to be moved away from the crankset axle against the return force of the spring.

Figure 17:
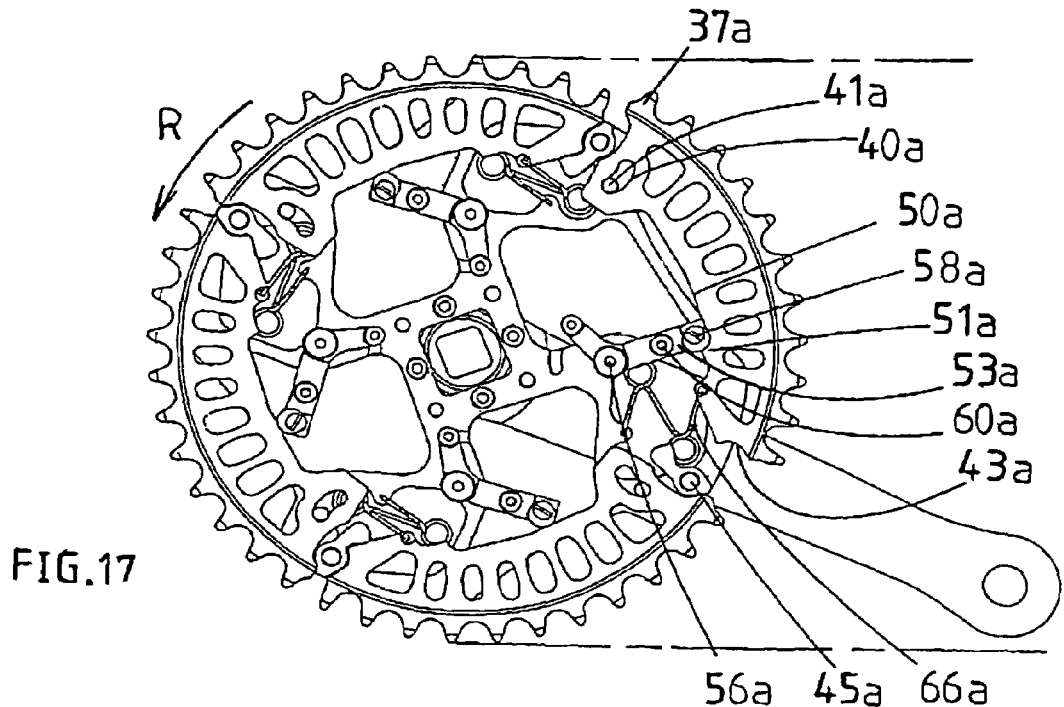

At the end of this second shifting phase, as shown in FIG. 17, the head 58*a* of the lever 53*a* abuts against the return 51*a*. The stop 60*a* escapes from the connecting rod 76 through a flexion of the flexible zone 79 of the base 78.

In this position of the lever 53, the arm 54*a* prevents the segment from pivoting about an axis defined by the pin 41*a*. The arm is oriented right beyond the line of action of the force exerted by the segment, such that the lever and the segment are maintained in a stable position.

The forward zone is also maintained in a stable position of balance. Indeed, in the absence of bias from the chain, the return force of the spring 66*a* is sufficient for maintaining the lower end of the bean-shaped slot 40*a* in support against the pin 41*a*. When the segment is subject to a tension from the chain, the resulting bias is essentially oriented along a tangent to the curve of the segment. Under these conditions, the pin cooperates with the edge of its slot to regain this tangent bias. The reaction that the pin exerts on the segment reinforces the stable position of this forward zone in view of the support of the segment on the lever head, and the curve of the bean-shaped slot.

In this high position, the first tooth 37*a* of the segment 14*a* is spaced from the last tooth of the segment preceding it by one chain pitch.

If the connecting rod is maintained in its angular position of FIG. 12, it proceeds with the extension of the segments as the chainwheel rotates, and as the extension stops abut against its base.

Once all of the segments have been transferred to the extension position, the servomotor returns the connecting rod to its intermediate position of FIG. 14, out of the reach of the indexing stops.

The transfer of the segments to their retraction position occurs by bringing the connecting rod to the position of FIG. 12 where it is on the trajectory of the retraction stops, particularly the stop 61*a* of the lever 53*a*.

Figure 18:
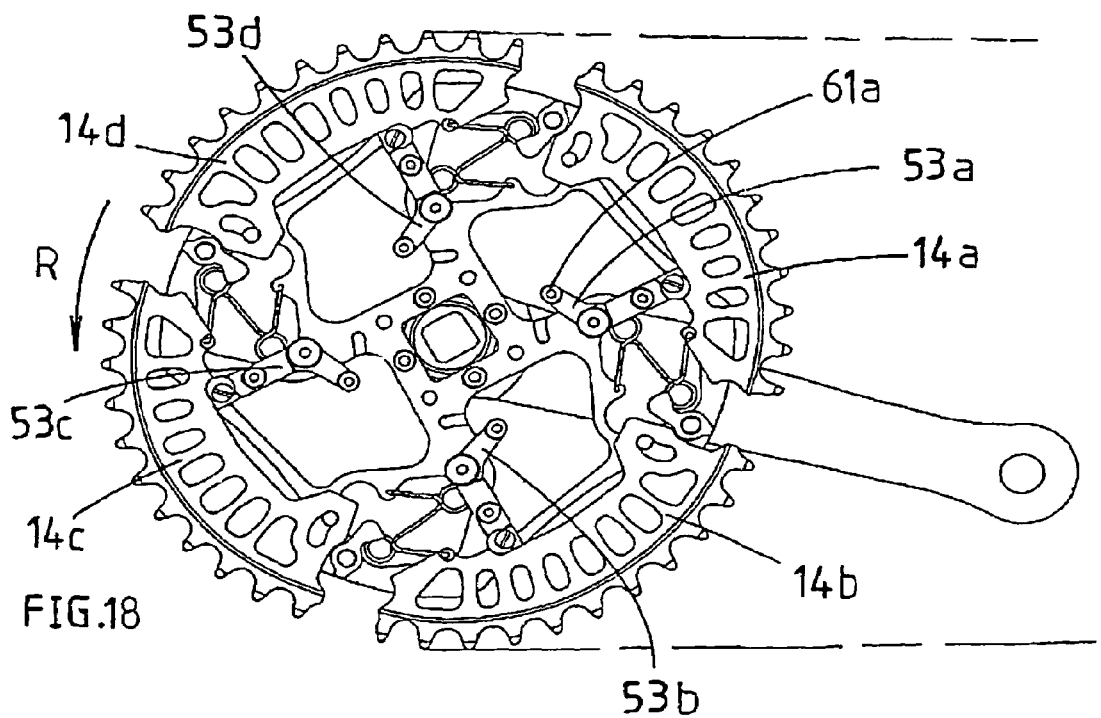
FIG. 18 is a view of the sprocket with all of its segments in a high position.

In their original position, all of the segments occupy a high position shown in FIG. 18. By immobilizing the retraction stop, the connecting rod forces the lever 14*a* to pivot so that its head 58*a* leaves the support of the return 51*a* and follows the ramp 50*a* in the reverse direction. During this first phase, under the effect of traction of the spring, the segment shifts about the pin 41*a*. Its rearward zone is brought closer to the crankset axle until the notch 43*a* takes support against the guiding abutment 45*a*.

The segment 14*a* is in the same configuration as the one shown in FIG. 16.

As the chainwheel follows its rotation, the lever 53*a* is brought back to the position that it occupies in FIG. 15, thus releasing the forward zone of the segment that is returned in the direction of the crankset axle by the residual traction of the spring.

In this position, the first tooth 37*a* of the segment 14*a* that is returned to its low position is located at a distance of two chain pitches from the last tooth 39*d* of the segment 14*d* that precedes it.

The machining of the last space between the teeth previously mentioned eases the dipping of the chain.

Alternative constructions of the chainwheel are possible. In particular, the guiding of the forward zone of the segment could be obtained by other means. Specifically, one could invert the slot and the pin to have the slot on the frame and the pin on the chainwheel. One could also invert the movement of double shifting, i.e., raise the rearward zone of the segment first and the forward zone last. The movement of the segment along a tangent direction could have an inverted direction so that, on the raising of the segment, there is a space of one chain pitch forward, rather than rearward, of the segment.

A single control lever is preferred for transferring the chainwheel from one position to the other. As an alternative, one could have two levers, such as the lever 53*a*, each responsible for controlling the raising or lowering of a sprocket zone. One could invert the functioning mode of a lever so that its articulation is on the segment and the ramp is on the frame.

Figure 19:
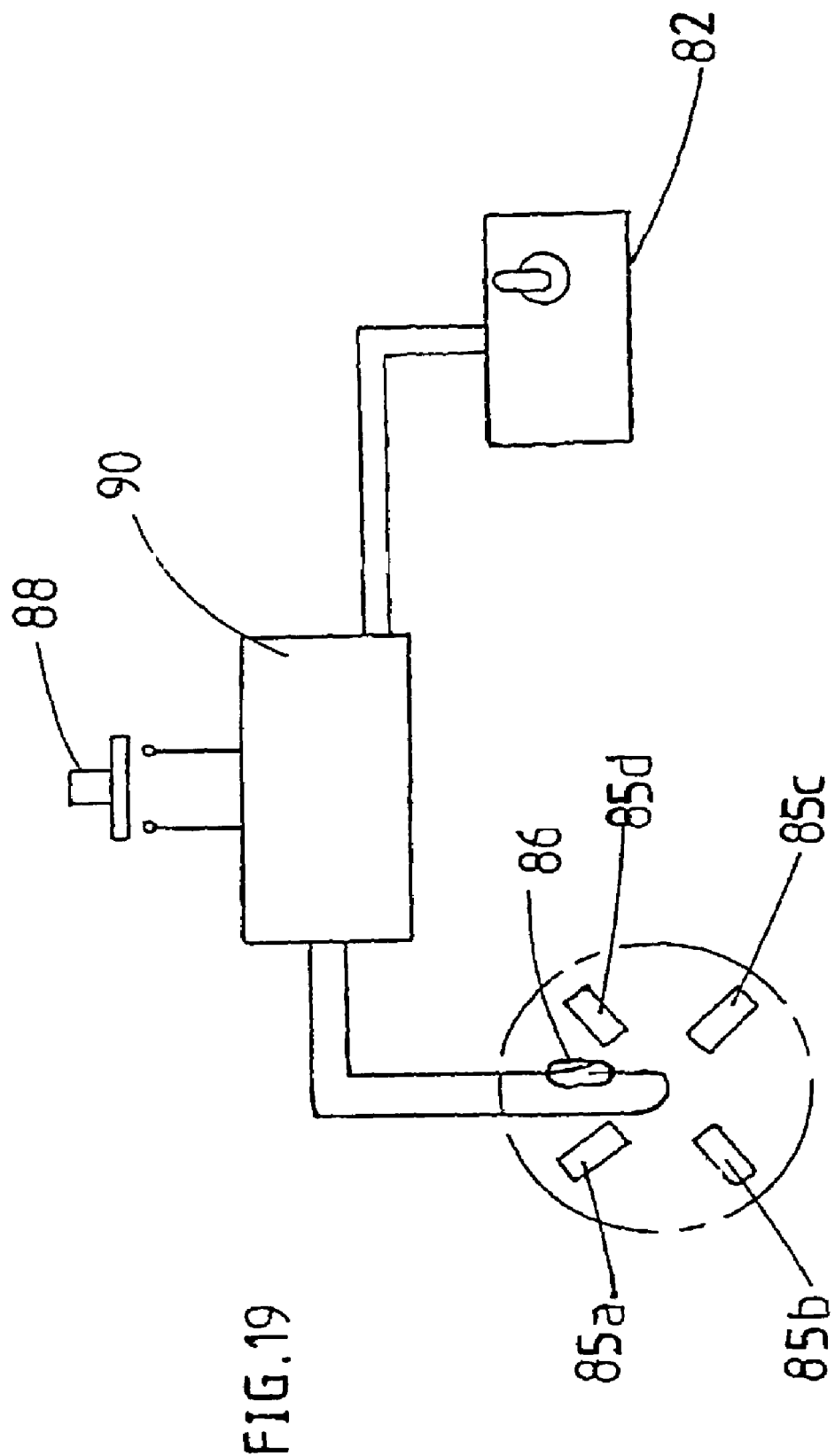
FIG. 19 schematically shows the electronic system for controlling the servomotor.

FIG. 19 schematically shows the electronic control system that guides the servomotor. This circuit has four magnets 85*a*, 85*b*, 85*c*, 85*d* that are mounted on the chainwheel at a right angle one from the other. A Reed type relay 86 is affixed to the frame of the bicycle. The passage of a magnet in front of the relay corresponds to a specific position of a control lever with respect to the base of the connecting rod.

The system has a control button 88 that can possibly be removed and a processing circuit 90. The processing circuit has a counting unit that is capable of counting the locking impulses of the Reed relay, and a processing unit that guides the servomotor 82. Initially, the servomotor is in its intermediary position, and its last position for guiding the connecting rod is saved.

Upon sending a command for changing the state of the chainwheel, as soon as the counting unit has counted an impulse, the processing unit guides the servomotor in the position opposite its last indexing position. Then the counting unit is actuated. As soon as it has counted four impulses corresponding to a complete turn of the chainwheel, the processing unit guides the servomotor to return it to its intermediate position, and saves the new guiding position from which the servomotor returns.

The servomotor is selected to be sufficiently quick so that a change of position of the connecting rod can occur before a new magnet is in front of the Reed relay within a reasonable range of rotational speed of the chainwheel.

Other means for guiding the servomotor are also possible, just as other means for controlling the levers are also possible. In particular, one could control the levers in a strictly mechanical way. One could also detect the passage of the segments other than by magnets and a Reed relay.

Additionally, it is possible to couple the electronic control system to a system for controlling the rear derailleur, particularly when the rear derailleur has an electrical control for coordinating a gear shift at the chainwheel with a shift at the rear derailleur, or even for controlling both transmission systems by means of a single control.

According to another means for using the control system, one could create an intermediate state of the chainwheel in which one portion of the segments is in a high position and one portion is in the low position. In the case of four segments, one could have two diametrically opposed segments in the high position, and the other two segments in a high position. Under these conditions, the chainwheel would function similarly to an oval chainwheel.

Figure 20:
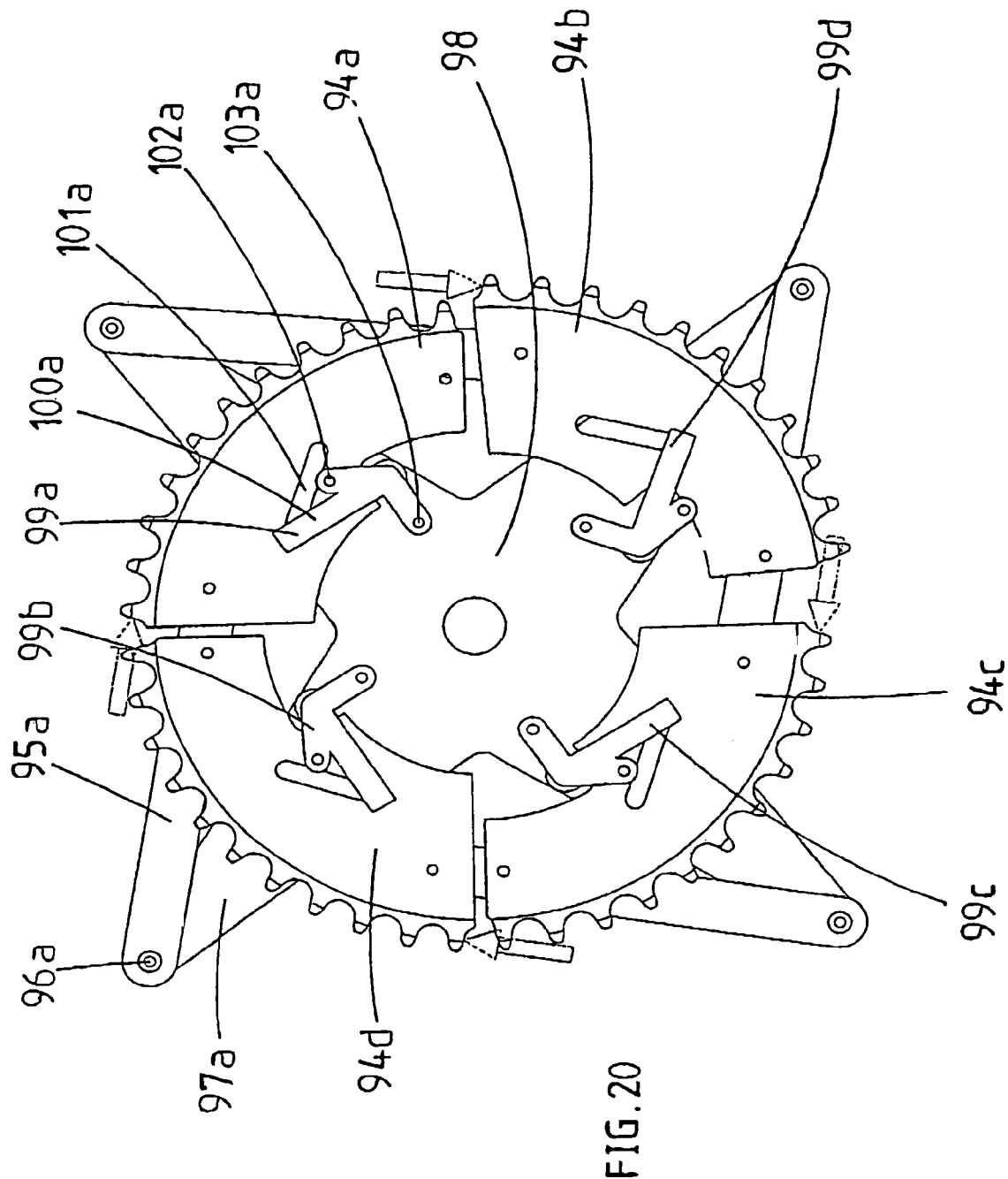
FIG. 20 corresponds to another constructional embodiment of the sprocket.

FIG. 20 shows another constructional embodiment of the chainwheel. The general concept here is to displace each of the segments from one position to the other through a strictly rotational movement. The low and high positions of a segment are identical to those that were described previously. Since these positions are determined, it is possible to identify an instantaneous center of rotation about which the segment must pivot according to a strict rotation in order to pass from one position to the other.

Thus, FIG. 20 shows four segments 94a, 94b, 94c, 94d. Each segment, particularly segment 94a, is affixedly attached to the end of an arm 95a, that is itself connected by an articulation about an axle 96a to the radial arm 97a of a frame 98. The position of the axle 96a was determined such that this axle corresponds to the instantaneous center of rotation of the segment. As can be seen in FIG. 20, the axle 96a is approximately at the intersection of a straight line tangent to the forward zone of the segment and of a straight line of radial direction passing approximately through the middle of the segment located forwardly of said segment.

The change of position of each of the segments is controlled by a lever, such as the lever 99a. This lever has a first arm 100a that cooperates with a slot 101a of the segment to control the amplitude of the angular movement about the axle 96a, and two auxiliary arms that each bears an indexing stop 102a, 103a that allows controlling the shifting of the lever. This means for controlling the shifting of the lever is similar to what was described above, and the lever is provided to cooperate with a connecting rod that has not been described in detail.

In order to illustrate the invention, the segment 94b is shown in the high position whereas the other segments are in the low position. One can see that at the junction between the segments 94a and 94b, the teeth are in correspondence with the chain pitch without an intermediary pitch. At the junction with the rearward segment 94c, there is an intermediary chain pitch. Thus, the teeth of the chainwheel are maintained in correspondence with the chain pitch on the raising as on the lowering.

Figure 21:
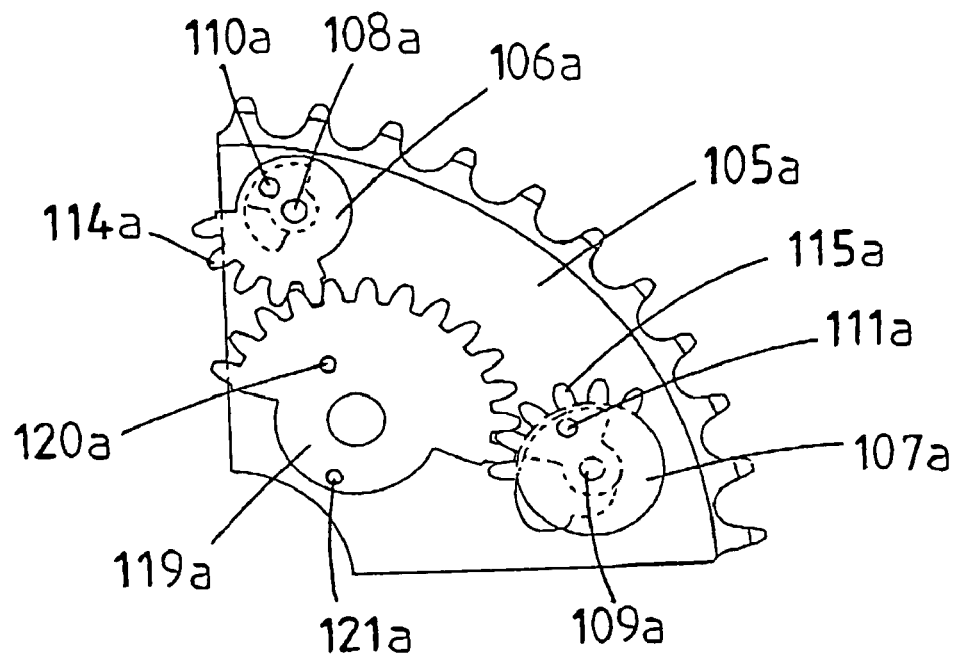
FIGS. 21 and 22 show another constructional embodiment of the sprocket.
Figure 22:
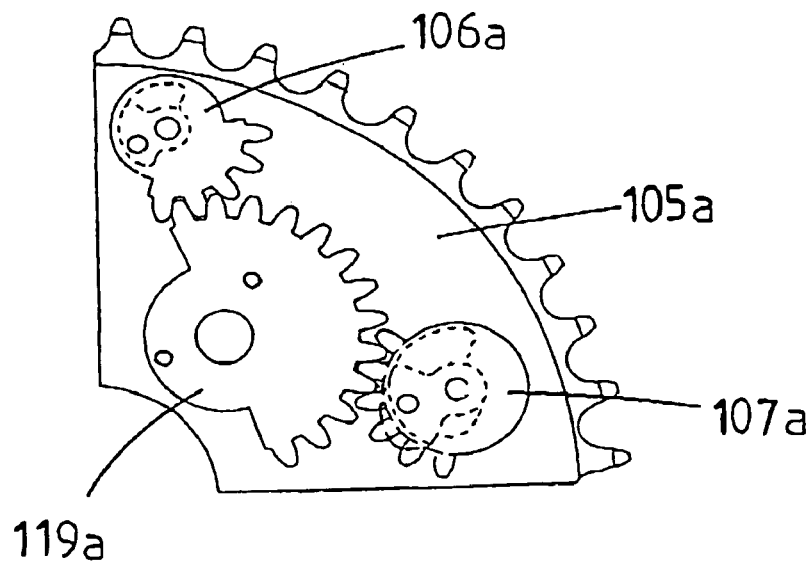

Another constructional method is schematically shown in FIGS. 21 and 22. According to this constructional embodiment, the trajectory of a segment 105a is guided by means of two cams 106a, 107a, one located in the forward zone, the other in the rearward zone. The cams pivot about axles 108a, 109a mounted on the segment, and off-centered axles 110a and 111a mounted on a crankset frame. Each cam has teeth 114a, 115a at its periphery.

The rotation of the cams can possibly be controlled in a synchronized manner by a pinion 119a, also mounted on the chainwheel, and by means of two stops 120a, 121a that operate according to the same functioning mode as the preceding stops. According to an alternative embodiment, the cams could be replaced by connecting rods.

The relative position of the axles 108a, 110a, 109a, 111a and the primary diameter of the teeth 114a and 115a are determined such that, as in the preceding cases, the segment is displaced along a radial component and a tangent component that maintain the teeth in correspondence with the chain pitch during the transitory phases of extension and retraction.

Figure 23:
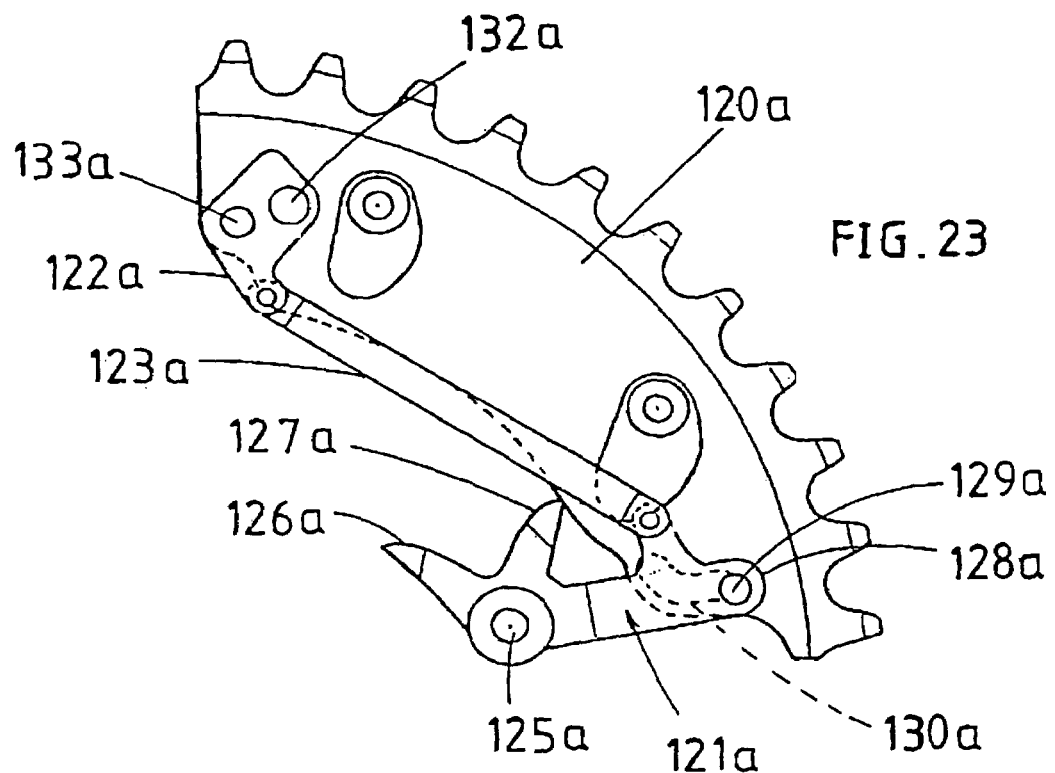
FIGS. 23 and 24 relate to another constructional embodiment.
Figure 24:
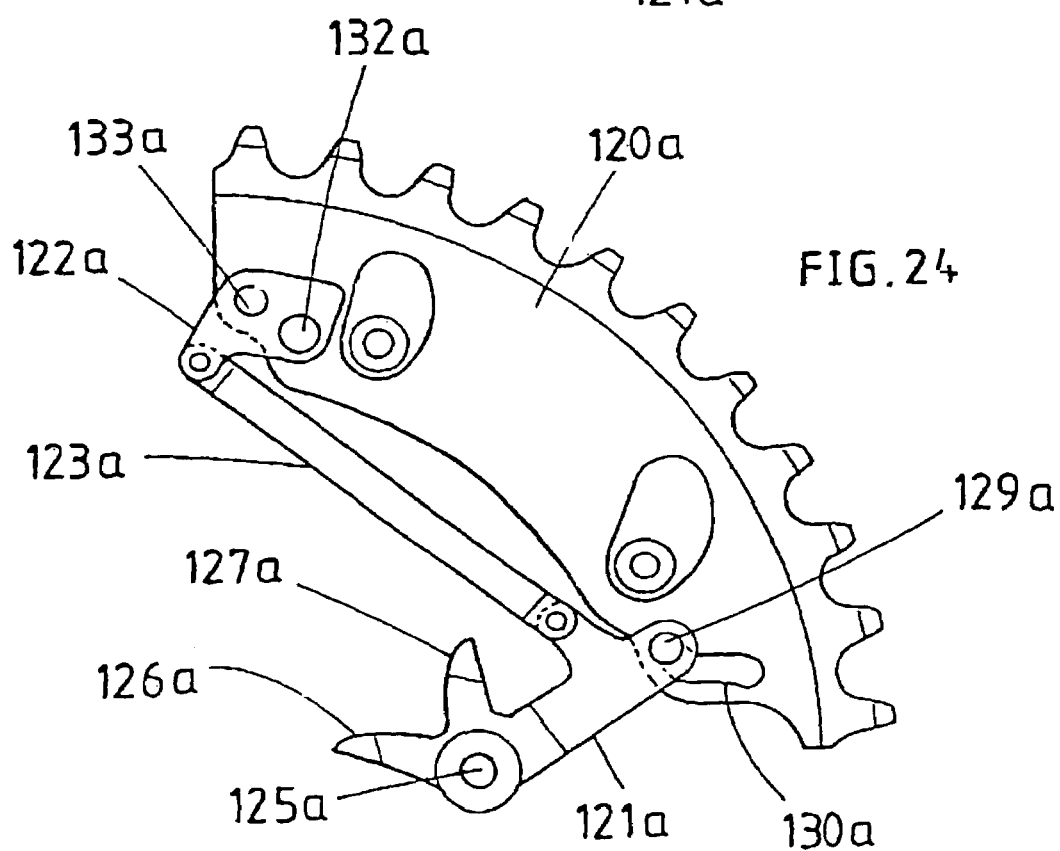

According to the alternative of FIGS. 23 and 24, the trajectory of a segment 120a is guided by a shifter 121a and a cam 122a connected together by a connecting rod 123a. The shifter 121a is pivotally mounted about an axle 125a borne by the chainwheel frame. The frame is not shown in FIGS. 23 and 24.

Toward the axle 125a, the shifter has two arms 126a, 127a that are provided to be fastened by an indexing member, for example, an indexing connecting rod such as the connecting rod 76 described above, so as to guide the change of state of the segment.

The shifter 121a furthermore has a head 128a with a pin 129a that moves in a slot 130a cut out from the side of the rearward end of the segment 120a.

The slot 130a generally has the form of an "S," with a central portion oriented approximately in a radial manner, and two rounded ends for the two high and low positions of the segment.

Toward the other end, the segment is displaced by a cam 122a articulated about an axle 132a borne by the frame and connected to the forward end of the segment 120a by a pin 133a. The pin 133a is displaced by the cam on both sides of an imaginary circle centered on the chainwheel axle and passing through the axle 132a. The shifter 121a and the cam 122a are connected by a connecting rod 123a that synchronizes their movement.

The rotation of the shifter induces a displacement of the rearward end of the segment along radial and tangent components. The cam induces a displacement of the segment mainly along a radial direction.

Optionally, the shifter 121a and the cam 122a are housed in housings cut into the chainwheel frame. The lateral walls of these housings serve as a force recovering abutment for the two extreme positions of the shifter and of the cam, so as to recover the forces induced by the tension of the chain.

As in the preceding cases in the low position, the first teeth of the various segments are juxtaposed to the last teeth of the segment preceding them so that the teeth of the various segments are continuous and in correspondence with the chain pitch. In the high position, these teeth are spaced apart by one chain pitch. The segments are guided individually, and the change of position of each segment preferably occurs when the segment in question is in the raising zone of the sprocket.

The present description is only given as an example, and other embodiments of the invention could be used without leaving the scope thereof.

In particular, the number of segments of the chainwheel is not limiting, and one could have more than or less than four segments. Furthermore, the number of teeth of the sprocket is not limiting either. An example of a chainwheel having a state of 44 teeth and an imaginary state of 48 teeth has been described. The invention could be applied to a chainwheel of 48 teeth having an imaginary state of 52 teeth through an extension of the segments, or yet a chainwheel of 49 teeth that can be extended to 53 teeth by using non-identical segments, three having 12 teeth and one 13 teeth.

Thus, the invention allows modifying the development of the front transmission system by changing the state of the chainwheel through an extension of its teeth. Since there is no lateral transfer of the chain, and since the variation of the development induced is relatively low, the change of state of the chainwheel occurs under very good conditions of flexibility and smoothness, even when the chain is subject to a high tension.

Additionally, the energy necessary to the change of state of the chainwheel is primarily taken from the very rotation of the chainwheel. The servomotor, or another equivalent system, which controls a change of state of the chainwheel, consumes very low energy.

The invention claimed is:

1. A drive sprocket for a bicycle crankset, said drive sprocket comprising:
   a toothed ring, the ring comprising teeth having one pitch in correspondence with one chain pitch, the ring being divided into a plurality of segments, the segments being borne by a frame, the frame being rotationally movable about a crankset axle, each said segment being movable with respect to the frame in a plane perpendicular to the crankset axle between a low position and a high position in which each said segment is further distant from the crankset axle, thereby defining a small diameter state and a large diameter state of the sprocket, a system for transferring each said segment from one of said low and high positions to another of said low and high positions, and an indexing mechanism to control the system for transferring said segments, wherein each said segment is floatingly mounted with respect to the frame, and wherein said system for transferring each said segment between said low and high positions transfers each said segment in guided movement along a trajectory with respect to the frame, said trajectory of movement having a radial component and a tangent component, said tangent component being greater than zero.

2. A drive sprocket according to claim 1, wherein:
   the plurality of segments consists of four segments of 11 teeth each;
   in the low position, said four segments are adjacent each other;
   in moving from the low position to the high position, each adjacent pair of said four segments is moved apart by an amount corresponding to one additional chain pitch.

3. A drive sprocket according to claim 1, wherein:
   each of said segments has a forward zone and a rearward zone, a forward zone of each of said segments following a rearward zone of a preceding one of said segments;
   the radial component of the trajectory of movement of each said segment, a in moving from the low position to the high position, has a magnitude predetermined so that in the high position all of said segments are spaced apart by a distance corresponding to a whole number of a chain pitch; and
   the tangent component of the trajectory of movement of each said segment, in moving from the low position to the high position, has a magnitude predetermined so that a forwardmost tooth of each said segment is substantially in correspondence, without an intermediary pitch, with a rearwardmost tooth of an immediately preceding segment, while said preceding segment is in the low position.

4. A drive sprocket according to claim 1, each segment having a forward zone and a rearward zone, wherein one of the zones of the segment is guided with respect to the groove by a pin moving inside of a slot, and at least one shifting lever controls movement of the other zone of the segment.

5. A drive sprocket according to claim 4, wherein the movement of a segment is controlled by a single shifter having an arm supported against a ramp located at the base of the segment.

6. A drive sprocket according to claim 4, wherein each of the segments is elastically returned to the low position by a return spring mounted between the segment and the frame.

7. A drive sprocket according to claim 4, wherein the shifting lever has two arms, each bearing a stop for indexing the lever in one or the other of its positions for controlling the displacement.

8. A drive sprocket according to claim 7, wherein a connecting rod provided to be mounted on the bicycle frame controls the shifting of the lever by positioning itself on the trajectory of one or the other of the indexing stops.

9. A drive sprocket according to claim 8, wherein the displacement of the connecting rod is controlled by a member that is guided by an electronic control system having a member for detecting each of the segments and a processing circuit having a counting unit and a processing unit to guide the member for displacing the connecting rod.

10. A drive sprocket according to claim 1, wherein each of the segments is affixed to the end of an arm that is itself connected to the radial arm of a frame about an axle located at the instantaneous center of rotation.

11. A drive sprocket according to claim 1, wherein the change of position of a segment is guided by two cams, a first of the two cams being located in the forward zone, a second of the two cams being located in the rearward zone of the sprocket, whose synchronized rotation is controlled by a pinion.

12. A drive sprocket according to claim 11, wherein said sprocket has from 44 to 49 teeth in the small diameter state, and in the large diameter state, the sprocket has an effective expansion of 3 to 5 additional teeth.

13. A drive sprocket according to claim 1, wherein:
   said system for transferring each said segment between said low and high positions comprises, for each said segment, the following: a shifter mounted to the frame for pivotal movement about an axis, said shifter being connected to one of a forward zone and a rearward zone of the segment by a pin connected to a head of said shifter, and connected to the other of the forward and rearward zones by a cam, said cam being pivotally mounted to the frame and connected to the segment by a pin, the shifter and the cam being connected together by a connecting rod.

14. A drive sprocket according to claim 1, wherein change from said small diameter state to said large diameter state induces an expansion of approximately 10%.

15. A transmission system for a bicycle having a transmission chain and a set of pinions with a rear derailleur to transfer the chain from one pinion to the other, wherein the transmission system has a front drive sprocket according to claim 1.

16. A transmission system according to claim 15, wherein the rear derailleur is an electrically controlled derailleur, wherein the rear derailleur and the drive sprocket are controlled by an electronic control system coordinating control of the rear derailleur and of the drive sprocket.

17. A transmission system according to claim 15, wherein the transmission system has a front sprocket that is extensible between two states of 44 and 48 teeth, and a rear cassette of pinions having all or part of a set of pinions of 11, 13, 15, 18, 21, 25, 30, 36 teeth.

18. A drive sprocket according to claim 1, wherein:
said trajectory of movement of each said segment from said low to said high position includes a radial component of movement of a predeterminate extent away from the crankset axle and a tangent component of movement of a predeterminate extent in a first direction transverse to said radial component of movement;
said trajectory of movement of each said segment from said high position to said low position includes a radial component of movement of a predeterminate extent toward the crankset axle and a tangent component of movement of a predeterminate extent in a second direction opposite to said first direction.

19. A drive sprocket according to claim 1, wherein:
each of said segments comprises a plurality of teeth for meshing with and driving a chain.

20. A drive sprocket according to claim 1, wherein:
each of said segments is identical to others of said segments.

21. A drive sprocket for a bicycle crankset, said drive sprocket comprising:
a ring comprising a plurality of teeth having a pitch corresponding with a pitch of a chain adapted to mesh with said drive sprocket for comprising a component of a bicycle transmission assembly;
said toothed ring comprising plurality of segments, each of said plurality of segments having a plurality of said plurality of teeth of said ring;
a frame supporting said segments, said frame adapted to be rotationally movable about a crankset axle of a bicycle;
a transfer system for movement of said plurality of segments relative to said frame between a small diameter position of said drive sprocket and a large diameter position of said drive sprocket, each said sprocket segment being spaced farther apart from an axis of rotation of said drive sprocket in said large diameter position than in said small diameter position, said transfer system moving each said segment successively, one after another, during an extent of rotation of each said segment about said axis of rotation corresponding to a non-engagement phase between said teeth of each said segment and said chain;
said transfer system comprising an arrangement of parts to guide each of said sprocket segments successively along a predeterminate path of movement, said predeterminate path of movement comprising a combination of radial movement and tangential movement greater than zero, said radial movement being radial with respect to said axis of rotation and said tangential movement being tangential with respect to a circle centered on said axis of rotation;
an indexing mechanism to control said transfer system for movement of said drive sprocket between said small and large diameter positions.

22. A drive sprocket according to claim 21, wherein:
for each said segment, said transfer system comprises:
a shifter mounted to said frame about a first pivot axis, said shifter being connected to one of a forward zone and a rearward zone of the segment by means of a first pin spaced from said pivot axis, said shifter being connected to the other of the forward zone and the rearward zone of the segment by means of a cam, said cam being mounted to said frame about a second pivot axis and connected to the segment by means of a second pin, the shifter and the cam being connected by means of a connecting rod.

23. A drive sprocket according to claim 21, wherein:
in said large diameter position, said drive sprocket has an effective diameter approximately 10% larger than in said small diameter position.

24. A drive sprocket for a bicycle crankset, said drive sprocket comprising:
a ring comprising a plurality of teeth having a pitch corresponding with a pitch of a chain adapted to mesh with said drive sprocket for comprising a component of a bicycle transmission assembly;
said toothed ring comprising plurality of segments, each of said plurality of segments having a plurality of said plurality of teeth of said ring;
a frame supporting said segments, said frame adapted to be rotationally movable about a crankset axle of a bicycle;
a transfer system for movement of said plurality of segments relative to said frame between a small diameter position of said drive sprocket and a large diameter position of said drive sprocket, each said sprocket segment being spaced farther apart from an axis of rotation of said drive sprocket in said large diameter position than in said small diameter position, said transfer system moving each said segment successively, one after another, during an extent of rotation of each said segment about said axis of rotation corresponding to a non-engagement phase between said teeth of each said segment and said chain;
said transfer system comprising an arrangement of parts to guide each of said sprocket segments successively along a predeterminate path of movement, said predeterminate path of movement comprising a combination of radial movement and tangential movement, said radial movement being radial with respect to said axis of rotation and said tangential movement being tangential with respect to a circle centered on said axis of rotation;
an indexing mechanism to control said transfer system for movement of said drive sprocket between said small and large diameter positions;
wherein:
said plurality of segments consists of four segments, each of said four segments having an identical number of teeth for meshing with the chain, each of said segments following, in a direction of rotation about said axis of rotation, a preceding one of said segments, each of said segments having a forwardmost tooth and a rearwardmost tooth;
in said small diameter position of said drive sprocket, said segments are adjacent each other, whereby the forwardmost tooth of one of said segments is spaced behind the rearwardmost tooth of a preceding segment by a distance corresponding to one pitch, or a whole number multiple of said pitch, of the chain;
in moving along said predeterminate path of movement from the small diameter position of said drive sprocket to the large diameter position of said drive sprocket, each of said segments is moved substantially tangentially so that said forwardmost tooth of one of said segments is spaced behind said rearwardmost tooth of said preceding segment by an additional distance corresponding to one additional pitch of said chain, or a whole number multiple of said pitch of said chain.

25. A drive sprocket according to claim 24, wherein:
each of said four segments has 11 teeth, whereby, in said small diameter position, said drive sprocket has 44 teeth, and in said large diameter position, said drive sprocket has an effective 48 teeth, said effective 48 teeth comprising said 44 teeth plus a distance of one pitch each between successive ones of said four segments.

* * * * *